United States Patent [19]

Hansen

[11] 3,831,867

[45] Aug. 27, 1974

[54] APPARATUS AND METHOD FOR DISTRIBUTING TOXIC AGRICULTURAL CHEMICALS

[75] Inventor: Harold Valentine Hansen, Cordova, Ill.

[73] Assignee: Deere & Company, Moline, Ill.

[22] Filed: Nov. 10, 1972

[21] Appl. No.: 305,502

[52] U.S. Cl............................ 241/101.7, 241/186.2
[51] Int. Cl............................................ B02c 18/26
[58] Field of Search............ 241/101 M, 102, 101.7, 241/185 R, 186 R, 186 A, 186.2, 245, 247, 279, 278 R

[56] References Cited
UNITED STATES PATENTS

| | | | |
|---|---|---|---|
| 2,642,909 | 6/1953 | Osborne........................ | 241/101.7 X |
| R8,258 | 5/1878 | Meech........................... | 241/279 X |

Primary Examiner—Roy Lake
Assistant Examiner—DeWalden W. Jones

[57] ABSTRACT

Apparatus and method for distributing toxic agricultural chemicals such as insecticides or the like, the method comprising the steps of forming granules of the chemical into a shape-retaining solid, applying a thin coating of nontoxic substance to the solid to facilitate handling of the chemical, gradually reducing the solid to its granular form at a rate in relation to the speed at which the solid is moved over the ground, and distributing the granules to the ground as they are removed from the solid. The distributing apparatus comprises a mobile, ground wheel supported frame adapted to advance through a field, a support on the frame for supporting the solid chemical, a cutter for engaging the solid and reducing it to its granular form, and mechanism for advancing the solid toward the cutter, both the advancing mechanism and the cutter being driven from a ground wheel whereby the volume of chemical distributed remains proportional to the speed of the apparatus through the field.

7 Claims, 5 Drawing Figures

APPARATUS AND METHOD FOR DISTRIBUTING TOXIC AGRICULTURAL CHEMICALS

BACKGROUND OF THE INVENTION

The present invention relates generally to agricultural chemicals and more particularly to a method of preparing toxic chemicals such as insecticides or the like to facilitate their handling, and to a method and apparatus for distributing the prepared chemical evenly to the ground.

It is a prevalent agricultural practice to apply various chemicals to the soil during the planting operation, normally included among which is a granular insecticide for preventing insect damage to the seed and young plant. Due to its highly toxic nature, much care must be exercised in handling the insecticide chemical to prevent its inhalation or contact with exposed portions of the body. The handling problem is particularly serious during the planting operation when bags of the granular chemical are emptied into the insecticide hoppers on the planter, since the finer particles tend to contaminate the surrounding air and, unless proper precautions are taken, eventually are inhaled or settle out on the exposed portions of the operator. In addition, care must be exercised in disposing of the empty insecticide containers, due to the toxic residue remaining therein.

SUMMARY OF THE INVENTION

Accordingly, it is a primary object of the invention to provide a method of preparing toxic agricultural chemicals to facilitate their handling and thereby eliminate the dangers associated with the handling of conventional toxic chemicals.

It is a further object to provide a method and apparatus for dispensing the prepared form of the chemical in a safe and efficient manner.

It is yet a further object to provide a method and apparatus for dispensing the prepared form of a chemical in a uniform and even manner, irrespective of the ground speed of the dispensing apparatus.

It is a still further object of the invention to provide an apparatus capable of satisfying the aforementioned objects which at the same time is simple in operation and economical to manufacture.

In pursuance of these and other objects, the method of the invention comprises the steps of compressing or otherwise forming granules of the toxic chemical into a shape-retaining solid form, coating the solid form with a thin layer of nontoxic sealing material, the coating permitting handling of the chemical without its coming in contact with the skin of the handler and serving also as a weather-tight container for the chemical, gradually reducing the solid form of the chemical back to its granular form by means of a rotary cutter or similar device, and depositing the granules on the ground as they are removed from the solid form. To maintain an even distribution of the chemical, the rate at which the chemical is reduced to its granular form and thus at which the latter is deposited on the ground is directly proportional to the speed of the dispensing mechanism over the ground.

The apparatus of the invention comprises a mobile frame which, in the preferred form of the invention, consists of a press wheel frame of a conventional corn planter, a support on the frame for supporting the chemical in its solid form, a rotary cutter mounted adjacent to one end of the support and engageable with one end of the solid form to reduce the same to its granular form, a housing for receiving the chemical granules and directing them to the ground, mechanism for advancing the solid form toward and into engagement with the cutter, and drive means for driving both the cutter and advancing means from the press wheel, so that the rate at which the solid form is reduced to its granular form is directly related to the ground speed of the planter. In the preferred form of the apparatus, the cutter and advancing mechanism are both mounted above the press wheel and are driven by a chain from a sprocket on the press wheel axle.

Due to the nontoxic coating on the solid form of the chemical, it will be appreciated that up to the time at which actual dispensing of the chemical is begun, the chemical remains unexposed and thus presents no handling problems. To load the dispensing apparatus, the operator need merely place a coated block of chemical on its support. This is in contrast to conventional practice wherein the operator must wear protective clothing and a breathing device while pouring the granular chemical into its hopper on the planter. During the dispensing process, only a limited area of the chemical is exposed, and this is shielded and remote from the operator. As the solid chemical is reduced to its granular form by the rotary cutter, the latter also removes the protective coating. The coating material is delivered to the ground with the chemical, thus eliminating the problem of disposing of the chemical container.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
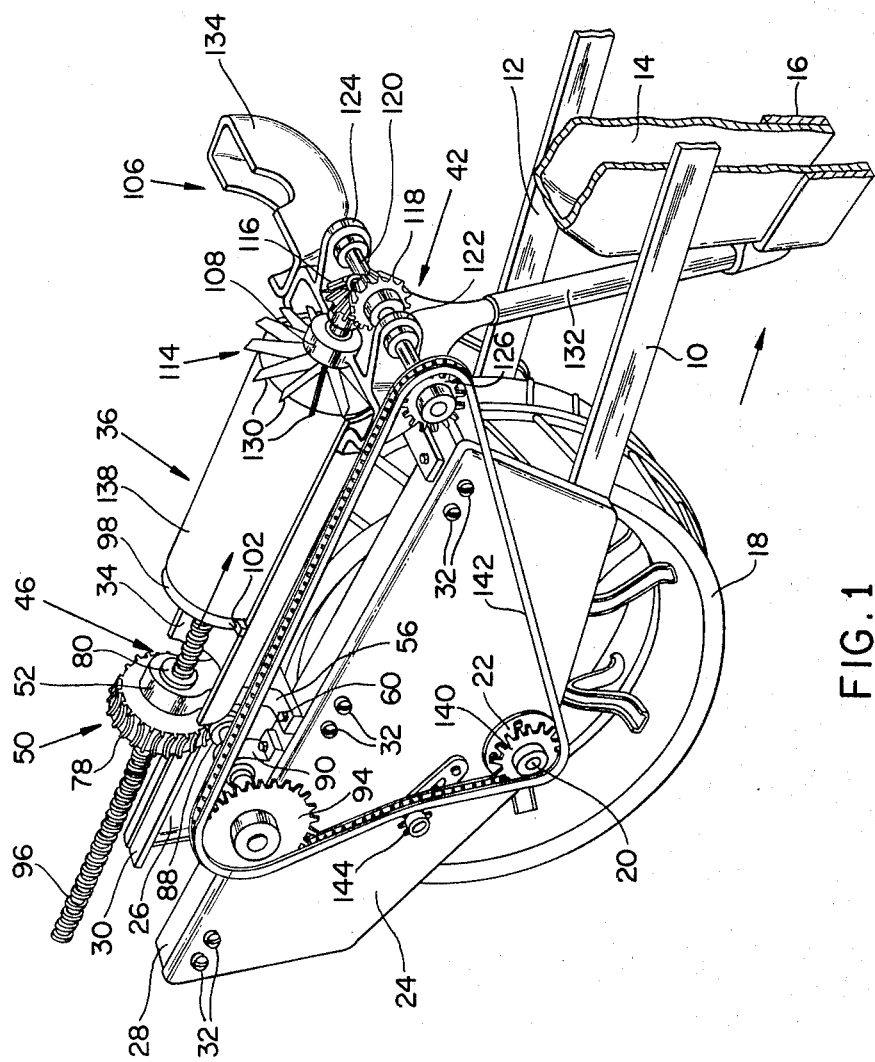
FIG. 1 is a fragmentary perspective view of a planter press wheel unit having the dispensing apparatus of the invention mounted thereon, the cover for the cutter element of the apparatus being shown in its open position.

Referring now to the drawings, there is shown fragmentarily in FIG. 1 a planter press wheel unit from a conventional planter of the type illustrated, for example, in U.S. Pat. No. 3,059,705, issued Oct. 23, 1962 to Oehler, et al. The unit includes a pair of frame members 10 and 12 which are pivotally connected at their forward ends to and extend rearwardly along both sides of a seed boot casting shown partially at 14 in FIG. 1. Mounted on the lower end of the casting 14 is a runner opener shown partially at 16 which forms a furrow for the seed as the planter is advanced forwardly. The soil which fills the furrow is firmly packed around the seed by a press wheel 18 disposed rearwardly of the seed boot 14 between the frame members 10 and 12, the wheel having an axle 20 which is rotatably supported at either end in bearings 22 mounted on the members 10 and 12, only one of the bearings being shown in the drawings.

A pair of sheet metal fenders 24 and 26 are connected along their lower edges to the frame members 10 and 12, respectively, and extend vertically therefrom alongside the press wheel 18. The vertical sides of a pair of angle iron members 28 and 30 are connected by means of fasteners 32 along the horizontal upper edges of the fenders 24 and 26, respectively, the horizontal sides of the members 28 and 30 extending inwardly from the fenders to serve as supports for the various elements which comprise the distributing apparatus of the invention.

The distributing apparatus includes a longitudinally extending, U-shaped support member 34 mounted above the press wheel 18 and centered between the fenders 24 and 26, the member 34 serving as a support for a solid cylindrical block 36 of agricultural chemical such as insecticide or the like. Threaded fasteners 38 secure the front end of the support to a U-shaped flange 40 formed on the rear wall of a funnel-shaped cutter housing 42, while the rear end of the support 34 rests on a projection 44 formed on the front side of a bearing support 46 and is secured thereto by means of a threaded fastener 48.

During operation of the apparatus, the insecticide block 36 is advanced forwardly along the support 34 by means of a pusher apparatus disposed at the rear of the support 34 and designated generally in the drawings by the numeral 50. The apparatus 50 includes the bearing support 46 which has the rear end of the member 34 connected thereto, the support 46 comprising a head portion 52 with a longitudinal, bearing-receiving bore formed therein, an upright portion 54 integral at its upper end with the head portion 52 and extending downwardly and forwardly therefrom, and right and left, generally horizontal legs 56 and 58 formed integrally with the lower end of the portion 54, the legs 56 and 58 extending in overlying relation with the horizontal sides of the angle iron members 28 and 30 and being secured thereto by means of fasteners 60 and 62. A similar bearing support member 64 is disposed rearwardly of the bearing support 46 and includes a head portion 66 with a bearing-receiving bore therein aligned longitudinally with the bore in the portion 52 of the member 46, an upright portion 68 formed integrally with the head portion 66 and extending downwardly and rearwardly therefrom, and a right and left pair of generally horizontal legs 70 and 72 formed integrally with the lower end of the portion 68, the legs 70 and 72 resting at their outer ends on the horizontal sides of the angle iron members 28 and 30 and being secured thereto by means of fasteners 74 and 76. A worm gear 78 is disposed between the bearing supports 46 and 64 and has cylindrical bosses 80 and 82 formed thereon which extend respectively forwardly and rearwardly through the aligned bores in the head portions 52 and 66 of the supports 46 and 64, and are rotatably supported therein by bearings 84 and 86, respectively. In driving engagement with the lower portion of worm gear 78 is a worm 88 which extends laterally between the angle iron members 28 and 30 and is rotatably supported thereon by bearing members 90 and 92, respectively. The right end of the worm 88 extends through the bearing member 90 and has a sprocket 94 mounted on its outer end for the purpose of driving the pusher mechanism in a manner to be subsequently described.

A threaded rod 96 extends through a longitudinal aperture in the worm gear 78 and engages mating threads formed in the wall defining the aperture. Rotation of the worm gear 78 thus causes the rod 96, when the latter is restrained against corresponding rotation, to move axially relative to the gear. A circular pusher plate 98 is fixed to the forward end of the rod and is movable axially therewith along the U-shaped support 34, the front face of the plate being engageable with the rear end wall of the cylindrical insecticide block to advance the block forwardly along the support. The front face of the plate has a plurality of sharpened spikes 100 thereon which are engageable with the block 36 to prevent relative rotation between the plate and block. A pair of laterally extending projections 102 and 104 formed on the edge of the plate 98 are engageable with the horizontal edges of the support 34 to prevent the threaded rod 96 from rotating with the worm gear 78, and thereby to assure that the rod is advanced axially relative to the gear in response to rotation of the latter.

As the block 36 is advanced forwardly, it comes into engagement with a cutter apparatus disposed at the forward end of the support 34 and designated generally by the numeral 106. The apparatus 106 includes the funnel-shaped housing 42 which, as previously described, includes a flange 40 on its rear wall which supports the forward end of the member 34. A cylindrical boss 108 formed on the front wall of the housing 42 is apertured to receive a longitudinal shaft 110, the shaft 110 being rotatably supported in the aperture by means of a bearing 112. Mounted on the rearward end of the shaft 110 is a multi-bladed cutter 114, while mounted on the forward end thereof is a bevel gear 116, the latter being in driving engagement with a bevel gear 118 on a transverse shaft 120 supported on the front wall of the housing 42. A pair of arms 122 and 124 fixed to the front wall of the housing 42 and extending forwardly on either side of the shaft 110 rotatably support the shaft 120, the right end of the shaft 120 extending through the arm 122 and having a sprocket 126 mounted thereon in alignment with the sprocket 94 on the worm shaft 88.

Figure 2:
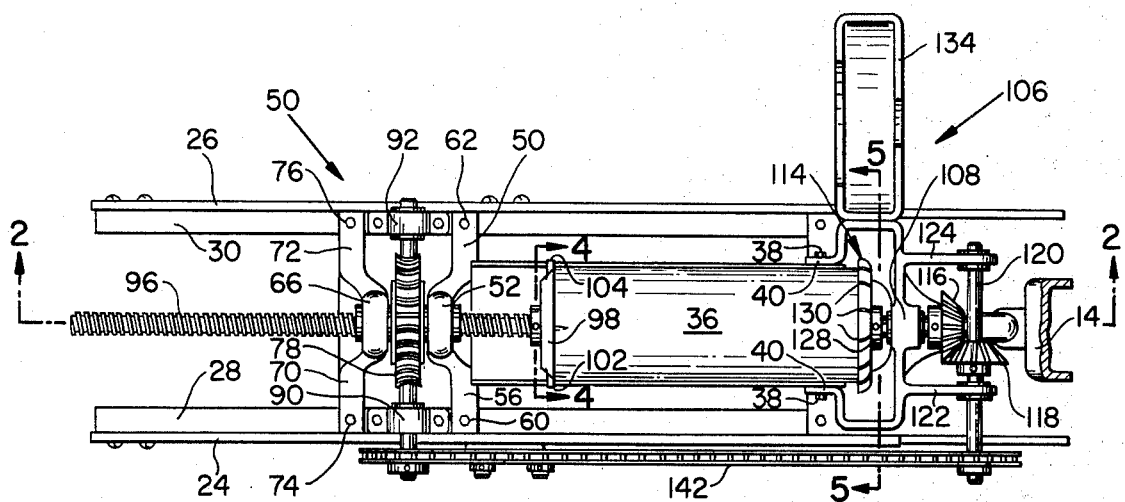
FIG. 2 is a plan view of the apparatus shown in FIG. 1.
Figure 3:
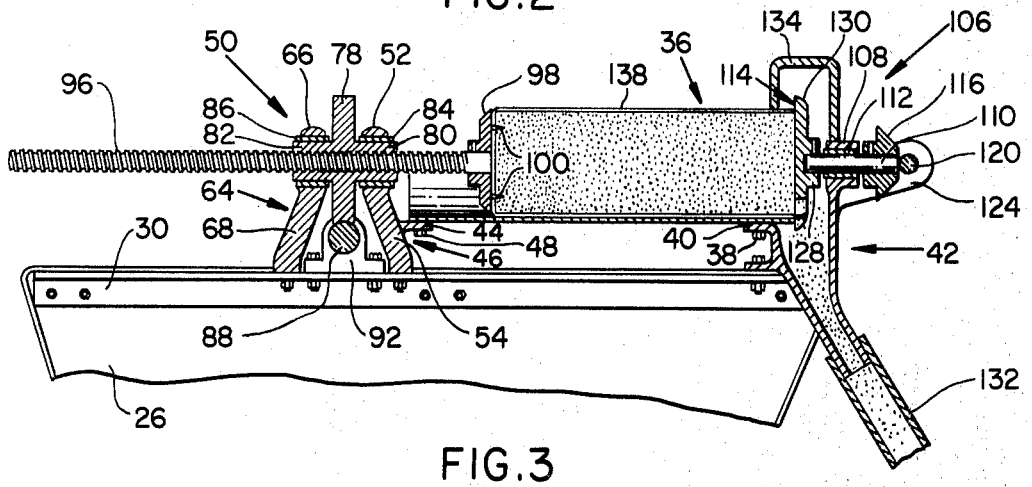
FIG. 3 is a sectional view taken along the line 3—3 of FIG. 2, the cover for the cutter element being shown in its closed position.
Figure 4:
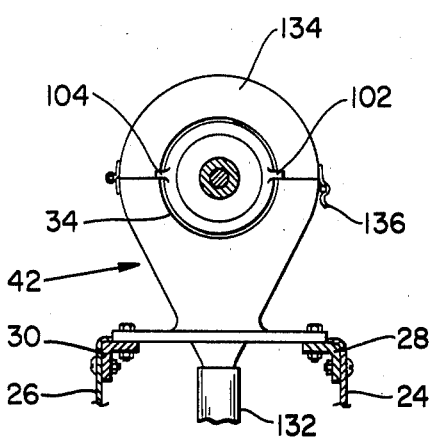
FIG. 4 is a sectional view taken along the line 4—4 of FIG. 2.
Figure 5:
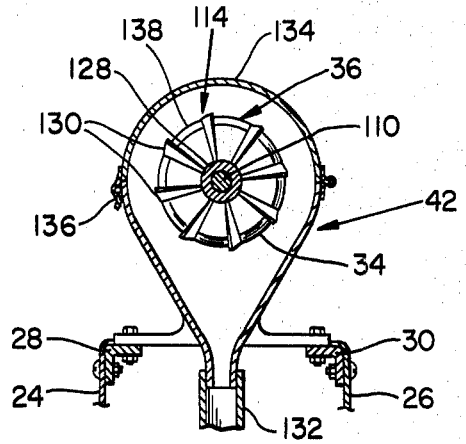
FIG. 5 is a sectional view taken along the line 5—5 of FIG. 2.

The cutter 114 comprises a hub 128 apertured to receive the rearward end of the shaft 110, and a plurality of sharpened blades 130 fixed to and extending radially from the hub 128. As the cutter is rotated, by means to be subsequently described, and the solid insecticide block pushed forwardly into engagement therewith, the blades 130 reduce the solid block to its granular form and the granules gravitate down through the housing 42 and into a tube 132 communicating therewith, the tube directing the granules downwardly and forwardly to a discharge point just to the rear of the runner opener 16. A semicylindrical cover 134 is hinged to one side of the housing 42 and is swingable from an open position shown in FIGS. 1 and 2 to a closed position shown in FIGS. 3–5, the cover in the latter position being operative to confine the granules removed from the solid form and prevent their escape from the housing 42 except through the tube 132. The cover is normally retained in its closed position by means of a spring clip 136.

Although the solid insecticide block 36 may be formed in several different ways, according to the preferred embodiment of the invention, granules of the chemical are subjected to a high pressure to fuse them into a solid block. As an alternative, an inert binding agent may be added to the granules to increase their cohesion. A nontoxic sealing substance, which may, for example, comprise a wax or plastic, is applied in a thin layer 138 on the outer surface of the insecticide block to prevent contact with the chemical and also serve as a moisture-proof container for the chemical. As the block is reduced to its granular form by the cutter 114, the coating 138 is simultaneously removed from the block and reduced to shavings which fall to the ground with the chemical granules through the tube 132.

In order to maintain an even distribution of the chemical over the ground irrespective of the speed of the planter, both the pusher apparatus 50 and the cutter apparatus 106 are driven by the press wheel 18. To this end, a sprocket 140 is mounted on the right end of the press wheel axle 20 in alignment with the sprockets 94 and 126 on the worm shaft 88 and bevel gear shaft 120, respectively, and engages a chain 142 which is drivingly trained around the sprockets 94 and 126. An adjustable idler sprocket 144 on the fender 24 is operative to maintain proper operating tension in the chain 142.

The distributing apparatus of the invention is prepared for operation by moving the rod 96 and pusher plate 98 to their extreme rearward positions and inserting a cylindrical block of insecticide 36 in the U-shaped support 34, the block being forced against the plate 98 so that the spikes 100 extend thereinto. The rod 96 and plate 98 are next advanced forwardly until the front side of the block 36 engages the cutter blades 130, and the cutter is then rotated to remove the protective coating from the front side of the block. As the planter is moved along the field, the press wheel 18 drives the pusher apparatus 50 to continually advance the block forwardly against the cutter 114, and the blades of the latter, also driven by the wheel 18, engage the front side of the block 36 and reduce the solid form of the chemical to a granular form. The granules removed from the block gravitate through the tube 132 and are deposited in the seed furrow just rearwardly of the runner opener 16.

I claim:

1. Apparatus for distributing an agricultural chemical comprising: a mobile frame adapted to advance through a field; support means mounted on the frame for supporting a solid block of agricultural chemical; cutter means mounted on the frame for engaging said solid block of agricultural chemical and reducing the same to a granular form as one of said solid block and cutter means is advanced toward the other; means on the frame for collecting granular form chemical removed from the block by the cutter means and depositing it on the ground; and means on the frame for advancing one of said solid block and cutter means toward the other at a speed in direct relation to the speed of said mobile frame.

2. Apparatus for distributing an agricultural chemical comprising: a mobile frame adapted to advance through a field; support means mounted on the frame for supporting a compressed solid of agricultural chemical; cutter means mounted on the frame for reducing the compressed solid to a granular form as the solid is advanced toward and into engagement with said cutter means; a housing mounted on the frame beneath the cutter means for receiving the granular form chemical removed from the compressed solid by the cutter means and directing the same toward the ground; and means on the frame for advancing the compressed solid toward and into engagement with the cutter means.

3. The invention defined in claim 2 including means on the frame for advancing the compressed solid toward and into engagement with the cutter means at a speed in direct relation to the speed of said mobile frame.

4. The invention defined in claim 3 wherein said mobile frame includes a ground-engaging wheel adapted to rotate at a speed in direct relation to the speed of said mobile frame; and including drivable means on the frame for advancing the compressed solid toward and into engagement with the cutter means; and drive means interconnecting said wheel and said drivable means for driving the latter at a speed in direct relation to the speed of rotation of said wheel.

5. The invention defined in claim 2 including means for driving said cutter means at a speed in direct relation to the speed of said mobile frame.

6. The invention defined in claim 5 wherein said mobile frame includes a ground-engaging wheel adapted to rotate at a speed in direct relation to the speed of said mobile frame; and including drive means interconnecting said wheel and said cutter means for driving the latter at a speed in direct relation to the speed of rotation of said wheel.

7. Apparatus for distributing an agricultural chemical comprising: a mobile frame adapted to advance through a field; support means mounted on the frame for supporting a compressed solid of agricultural chemical; cutter means mounted on the frame for engaging said compressed solid of agricultural chemical and reducing the same to its granular form as one of said compressed solid and cutter means is advanced toward the other; means on the frame for collecting granular form chemical removed from the block by the cutter means and depositing it on the ground; and means on the frame for advancing one of said compressed solid and cutter means toward the other as said mobile frame is advanced through a field.

* * * * *